US006923611B2

(12) United States Patent
Kenny

(10) Patent No.: US 6,923,611 B2
(45) Date of Patent: Aug. 2, 2005

(54) SELF-DRILLING FASTENER

(75) Inventor: Daniel J. Kenny, Roselle, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/171,000

(22) Filed: Jun. 13, 2002

(65) Prior Publication Data
US 2003/0231941 A1 Dec. 18, 2003

(51) Int. Cl.$^7$ ................................................ F16B 35/04
(52) U.S. Cl. ...................... 411/411; 411/387.1; 411/414
(58) Field of Search ................................. 411/411, 414, 411/423, 386, 387.1, 387.5–387.8, 424; 52/363, 483.1, 481.1, 481.2

(56) References Cited

U.S. PATENT DOCUMENTS

| | | | |
|---|---|---|---|
| 3,524,378 A | | 8/1970 | Wieber |
| 3,529,697 A | * | 9/1970 | Kossian et al. .......... 182/186.2 |
| 4,125,051 A | | 11/1978 | Herkes |
| 4,361,997 A | * | 12/1982 | DeCaro ........................ 52/512 |
| 4,453,361 A | * | 6/1984 | Hulsey .......................... 52/410 |
| 4,780,039 A | * | 10/1988 | Hartman ...................... 411/531 |
| 5,066,181 A | * | 11/1991 | Bogel ........................... 411/383 |
| 5,329,738 A | * | 7/1994 | Ovaert et al. ................. 52/410 |
| 5,391,029 A | | 2/1995 | Fardell |
| 5,489,179 A | | 2/1996 | Gabriel et al. |
| 5,540,531 A | * | 7/1996 | Choiniere ................. 411/387.1 |
| 5,605,423 A | * | 2/1997 | Janusz ..................... 411/387.6 |
| 5,642,974 A | | 7/1997 | Gabriel et al. |
| 5,649,798 A | * | 7/1997 | Ito .............................. 411/369 |
| 5,741,104 A | | 4/1998 | Lat et al. |
| 5,749,692 A | | 5/1998 | Kish et al. |
| 5,810,534 A | | 9/1998 | Carlisle et al. |
| 5,816,012 A | | 10/1998 | Willis |
| 5,865,584 A | | 2/1999 | Onofrio |
| 5,947,670 A | * | 9/1999 | Larson ..................... 411/387.5 |
| 6,361,259 B1 | | 3/2002 | Koeppel et al. |

FOREIGN PATENT DOCUMENTS

| | | |
|---|---|---|
| DE | 25 55 322 | 6/1977 |
| EP | 0 857 879 | 8/1998 |
| WO | 96 19675 | 6/1996 |

OTHER PUBLICATIONS

ITW Buildex, TEKS Wood–to–Metal Fasteners, Product Report No. 1205, 2001, Illinois Tool Works, Inc., Itaska, Illinois, US.

* cited by examiner

Primary Examiner—Flemming Saether
Assistant Examiner—Jori Schiffman
(74) Attorney, Agent, or Firm—Lisa M. Soltis; Mark W. Croll; Donald J. Breh

(57) ABSTRACT

A self-drilling fastener for attaching wood substrates to metal substrates comprises an elongate shank defining an axis, the shank having a first end and a second end. A drilling tip having a drill point and an axial length is formed at the first end. A broad head is formed at the second end. The shank includes a threaded portion and an unthreaded portion. The threaded portion axially extends from the drilling tip towards the head and includes helical threads and has an axial length, a root diameter, and a thread diameter. The length of the threaded portion is greater than the length of the drilling tip. The unthreaded portion axially extends from the threaded portion to the head and has an axial length and a diameter. The length of the unthreaded portion is substantially greater than the length of the threaded portion and the diameter of the unthreaded portion is smaller than the thread diameter of the threaded portion.

15 Claims, 3 Drawing Sheets

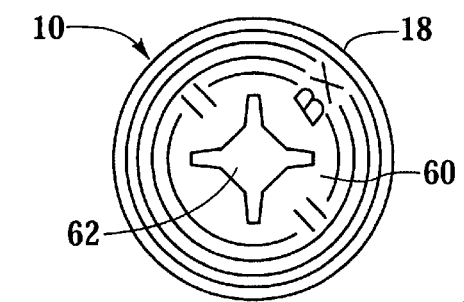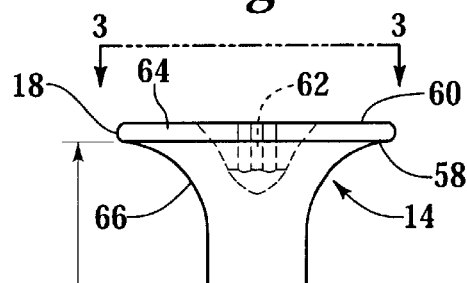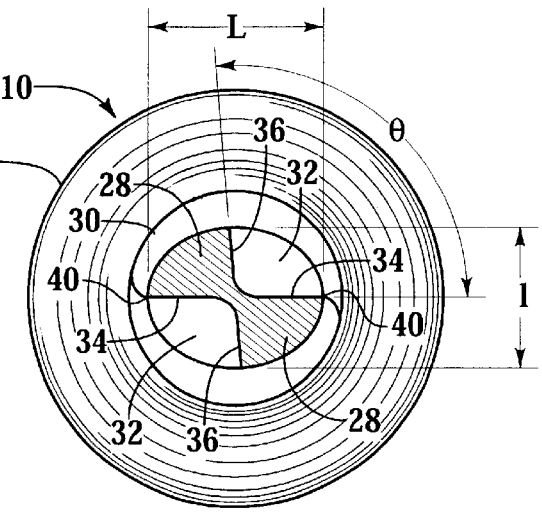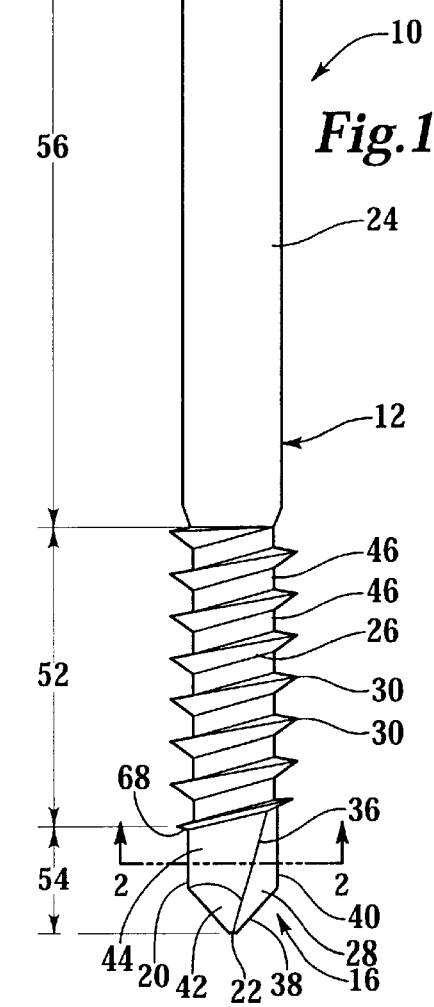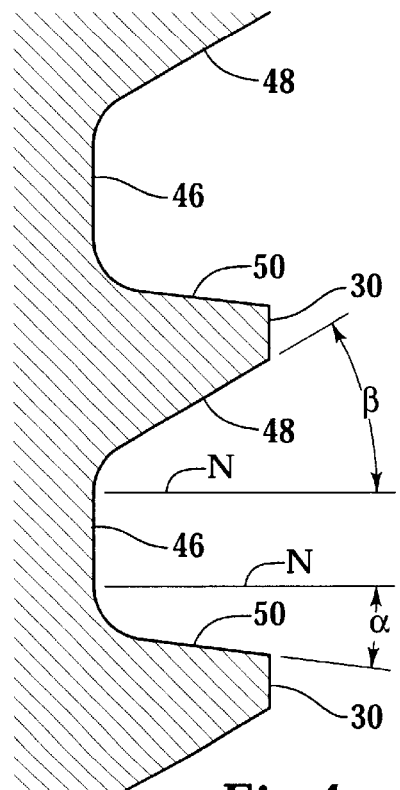

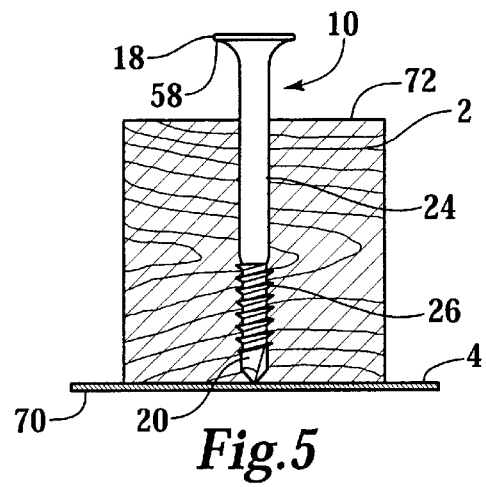
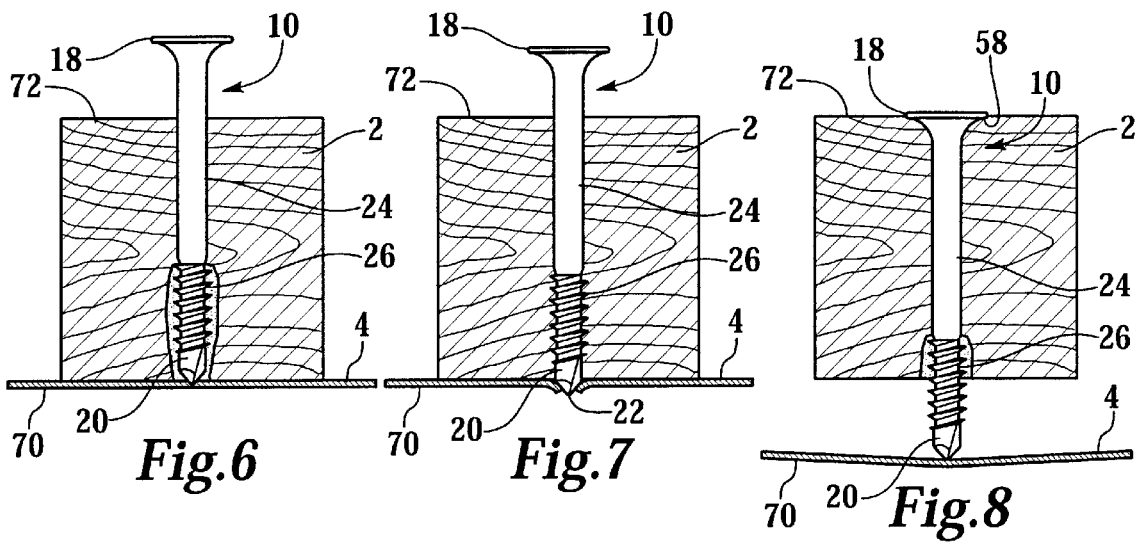
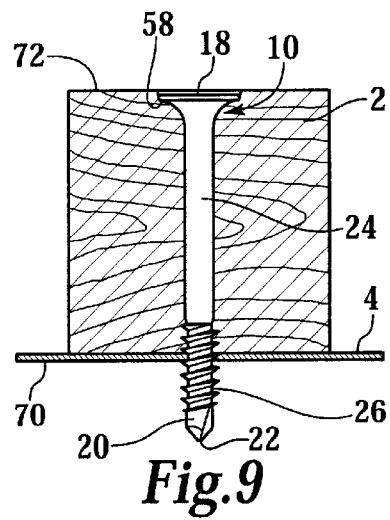

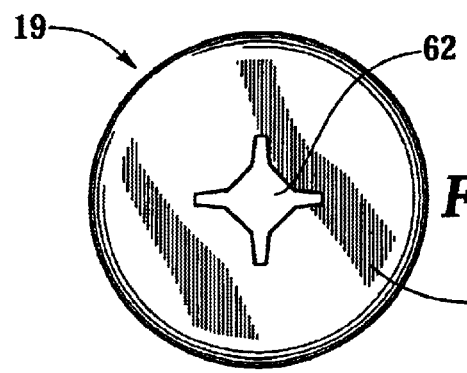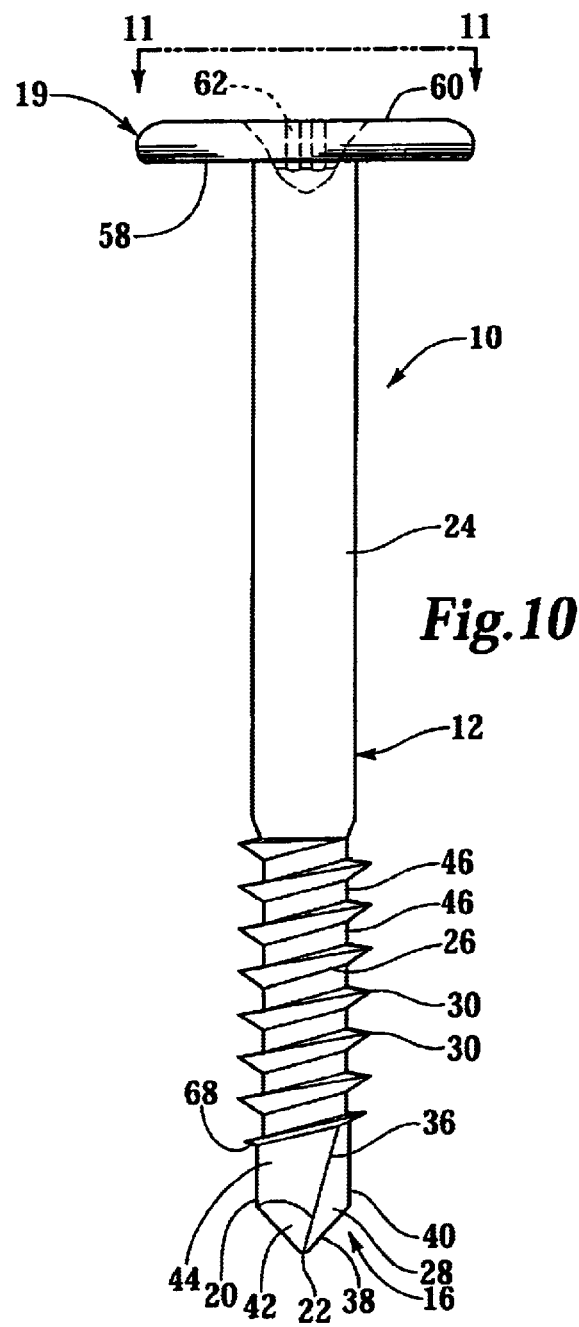

SELF-DRILLING FASTENER

BACKGROUND OF THE INVENTION

1. Field of the Invention

The present invention relates to the field of screw fasteners, particularly to fasteners for attaching wood substrates to metal substrates.

2. Description of the Related Art

Steel fasteners are known in the art for fastening wooden substrates, such as plywood or particleboard, to metal substrates, such as steel framing members. Commonly, these fasteners have an elongate shank and are designed to be axially driven by powered tools.

In many construction applications the metal support studs have been relatively thick, 12 gauge steel or thicker. A fastener for this application usually has an elongate shank having at least one threaded portion starting at an axial position near the head and axially extending along the shank, and many have included a set of wings that radially extend away from the drilling tip farther than the diameter of the threads so that the threads will not engage in the wood, which has been known to create difficulties drawing the wood towards the steel support. Most of the fasteners include a recess in the head to receive a bit from a fastener driving tool.

Examples of fasteners intended for this application include Illinois Tool Works Inc. part number 1082000, a 1 7/16 inch long fastener having wings for attaching plywood substrates up to 0.75 inches thick to steel, and Illinois Tool Works Inc. part numbers 1092000 and 1094000, a 2.25 inch long fastener and a 2.75 inch long fastener, respectively, each having wings, where both fasteners are for attaching thick wood substrates such as two-by-fours to thick steel. The wings are intended to bore out a hole with a diameter at least as large as the diameter of the threads so that they do not engage in the wood. After the wings hit the steel, they are intended to break off so they do not bore a hole in the steel larger than the threads, so that the threads will be able to tap the steel and clamp the steel and wood together. For each of these fasteners, the steel must be a certain thickness so that the wings will break off, at least 16 gauge steel for the 1 7/16 inch fastener, and at least 0.125 inches thick for the 2.25 and 2.75 inch fasteners.

Another fastener intended for attaching wood to steel support members is Hilti screw item number 00010429, a 3.5 inch screw having a 1.875 inch threaded portion proximate to the head of the fastener and a 1.5 inch long unthreaded portion from the threaded portion to the tip. The unthreaded portion of the Hilti screw is long enough to drill through the steel before the threads engage the wood. After pulling through the wood, the threads tap the steel and attach the wood to the steel.

Longer screws have had problems compared to shorter screws. First, longer screws are more expensive to manufacture because they required more material. Second, longer screws are harder to handle and keep stable as they are being driven into a substrate because they tend to wobble and not drive true. Third, longer screws have a longer drill time so that it is harder for an installer to quickly drive longer screws, making a job less efficient.

It has become a recent trend in the construction industry to use lighter steel, such as 18–22 gauge, for metal support members because lighter steel tends to be less expensive while still providing strength comparable to heavier steel. Winged fasteners, such as those described above, are not appropriate for attaching wood substrates to thinner steel because the wings on the drilling tip do not break off. The wings drill a hole in the metal that is larger than the threading, so that the threads cannot provide attachment to the steel. If the wings are removed, the long threaded portion described above tends to engage in the wood and continue to pull the fastener through the wood, or stop rotation of the fastener, causing the recess in the head to be stripped by the fastener driving tool. Also, the elongate threaded portion may not act to draw the metal support stud back towards the wood because the threads engage the wood and the steel, which tends to keep the wood and metal separated. Also, many applications require the attachment of a thick wood substrate, such as a two-by-four having a thickness of about 1.5 inches, to the thinner metal substrates described above.

What is needed is a self-drilling fastener for attaching wood with a thickness of about 1.5 inches, such as a two-by-four, to lighter gauge metal substrates that will draw the wood and the metal substrates towards each other and clamp the metal and wood together.

BRIEF SUMMARY OF THE INVENTION

In accordance with the present invention, a self-drilling fastener is provided for attaching wood substrates to metal substrates. The fastener of the present invention may be adapted to be axially driven by a power tool. The fastener of the present invention includes an elongate shank defining an axis, the shank having a first end and a second end. A drilling tip is formed at the first end of the shank, the drilling tip having a drill point and an axial length. A broad head is formed at the second end of the shank. The shank includes a threaded portion and an unthreaded portion. The threaded portion axially extends from the drilling tip towards the head and includes helical threads, an axial length, a root diameter and a thread diameter, where the thread diameter is greater than the root diameter and the length of the threaded portion is greater than the length of the drilling tip. The unthreaded portion axially extends from the threaded portion to the head and has an axial length and a diameter, where the diameter of the unthreaded portion is smaller than the thread diameter and where the length of the unthreaded portion is substantially greater than the length of the threaded portion.

Also in accordance with the present invention, a method for attaching wood substrates to metal substrates is provided. The inventive method includes the steps of providing the fastener as described above, placing the drill point of the fastener at a selected position on a wood substrate, drilling into the wood substrate with the drilling tip until the drill point hits a metal substrate, drilling into the metal substrate with the drilling tip until the threads reach the metal substrate, tapping the metal substrate with the threads of the threaded portion, pulling the metal substrate and the wood substrate together with the threads and clamping the metal substrate with the threads so that the metal substrate is tight against the wood substrate.

These and other objects, features and advantages are evident from the following description of an embodiment of the present invention, with reference to the accompanying drawings.

BRIEF DESCRIPTION OF THE SEVERAL VIEWS OF THE DRAWINGS

FIG. 1 is an elevation side view of a self-drilling fastener in accordance with the present invention.

FIG. 2 is a sectional view of a drilling tip of the self-drilling fastener taken along the line 2—2 in FIG. 1.

FIG. 3 is a top view of a head of the self-drilling fastener.

FIG. 4 is an enlarged side view of buttress threads of the self-drilling fastener of the present invention.

FIG. 5 is a side view of a completed wood drilling step.

FIG. 6 is a side view of a first alternative metal drilling step.

FIG. 7 is a side view of a second alternative metal drilling step.

FIG. 8 is a side view of a third alternative metal drilling step.

FIG. 9 is a side view of a completed clamping step.

FIG. 10 is a side view of an alternative embodiment of the self-drilling fastener, wherein the fastener has a wafer head.

FIG. 11 is an elevation view of the wafer head of the alternative embodiment of the self drilling fastener.

DETAILED DESCRIPTION OF THE INVENTION

A novel and inventive self-drilling fastener 10 for attaching a wood substrate 2 to a metal substrate 4 is shown in FIG. 1. Fastener 10 includes an elongate shank 12 having a head 18 at one end 14, and a wingless drilling tip 20 having a drill point 22 at the opposite end 16. Shank 12 includes an unthreaded portion 24 proximate to head 18 and a threaded portion 26 between unthreaded portion 24 and drilling tip 20. Threaded portion 26 axially extends from drilling tip 20 towards head 18, and unthreaded portion 24 axially extends between threaded portion 26 and head 18. Drilling tip 20 includes drill point 22 and at least one drilling flute 28 for directing metal shavings away from a hole drilled by fastener 10.

Wood substrate 2 could be one of several types of wooden pieces used in construction or fabrication. Examples include wooden support members, plywood and particle board. Metal substrate 4 could be one of many metal supports and is usually made of sheet steel. Examples include corrugated steel roof decks or steel support studs having a thickness between 26 gauge, or about 0.018 inches, and 14 gauge, or about 0.075 inches. Preferably, fastener 10 is used for attaching a wood substrate 2 that is a wooden support member such as a two-by-four, which currently have a thickness of about 1.5 inches, to a steel support member having a thickness gauge between 24 (about 0.024 inches thick) and 14 (about 0.075 inches thick).

Turning to FIGS. 1 and 2, drilling tip 20 is designed to allow fastener 10 to easily drill into metal substrate 4 so that threads 30 of threaded portion 26 can draw wood substrate 2 and metal substrate 4 together. Drilling tip 20 is a conventional wingless drilling tip for drilling into metal; see for example U.S. Pat. No. 4,781,506 to Roberts, et al., the disclosure of which is incorporated herein by reference. As shown in FIG. 2, drilling tip 20 has a generally elliptical cross-section with removed slots 32, which form flutes 28. The elliptical cross-section need not be a true ellipse, but is generally elliptical in form in that it has a major axis L and a minor axis l, as shown in FIG. 2. In one embodiment, the length of minor axis l is about 0.12 inches, or about 75% of the length of major axis L, which is about 0.15 inches.

Each slot 32 is framed by a generally planar leading surface 34 and a slightly angled trailing surface 36 (see FIG. 1). As shown in FIG. 2, leading surface 34 and trailing surface 36 are separated by an angle θ. Preferably, angle θ is larger than 90 degrees, and is in the range of between about 100 degrees and about 115 degrees. Each leading surface 34 includes a first cutting edge 38 and a second cutting edge 40. First cutting edges 38 come together to form drill point 22, while second cutting edges 40 are located at opposite ends of major axis L, as shown in FIG. 2. Leading surfaces 34 of slots 32 lie generally in the same place, while trailing surfaces 36 are slightly skewed, see FIG. 2. Each flute 28 also includes a generally conically shaped outer surface 42 near drill point 22 and a generally cylindrically shaped outer surface 44 extending axially between conical surface 42 and threaded portion 26, as shown in FIG. 1.

As fastener 10 is rotated, first cutting edges 38 bite into whichever substrate (either wood substrate 2 or metal substrate 4) that is being drilled into. Second cutting edges 40 act to further drill out material while slots 32 and flutes 28 act to direct material away from drilling tip 20 and the hole being drilled. As drilling tip 20 cuts away at the substrate, threads 30 eventually engage with the substrate and act to pull fastener 10 through the substrate.

Continuing with FIG. 1, threaded portion 26 of shank 12 includes a root 46 and helical threads 30 which extend radially from root 46. Threaded portion 26 acts to pull fastener 10 through wood substrate 2 and to draw metal substrate 4 and wood substrate 2 together in order to clamp the two substrates together. The diameter of root 46 is smaller than the outer diameter of threads 30. In one embodiment, threads 30 have an outer diameter that is between about 1.3 and about 1.5 times the diameter of root 46. In a preferred embodiment, root 46 has a diameter of about 0.15 inches and threads 30 have an outside diameter of about 0.215 inches.

The thread density of threaded portion 26 can be between about 13 and about 19 threads per inch, with a preferred thread density of about 17 threads per inch. In general, fewer threads per inch are needed for thinner metal substrates, and more threads per inch are needed for thicker metal substrates. Thread density is described in greater detail in U.S. Pat. No. 5,947,670 to Larson, assigned to the assignee of this application, the disclosure of which is incorporated herein by reference.

In a preferred embodiment, threads 30 are buttress threads, as shown in FIG. 4. Each thread 30 includes a leading support surface 48 on the bottom of each thread 30, and a trailing support surface 50 on the top of each thread 30. Trailing support surface 50 is oriented at a first angle α with respect to a line N normal to the axis of shank 12. Similarly, leading support surface 48 is inclined at a second angle β with respect to line N, where second angle β of leading support surface 48 is greater than first angle α of trailing support surface 50. In a preferred embodiment, first angle α is about 7 degrees and second angle β is about 30 degrees. Although standard thread forms may be used, the buttress thread configuration shown in FIG. 4 is preferred because it provides higher pullout strengths than standard threads.

Fastener 10 is designed so that at least one fill pitch of thread 30, and preferably at least two full pitches of threads 30, are on either side of metal substrate 4 when fastener 10 is installed (see FIG. 9). The length 52 of threaded portion 26 is greater than the length 54 of drilling tip 20. Length 52 is chosen so that there are few enough threads 30 so that the threads do not aggressively bite into wood substrate 2 and draw head 18 through the wood, but so there are enough threads 30 in both the direction toward head 18 and the direction toward drilling tip 20. There need to be enough threads 30 toward drilling tip 20 so there will be enough thread exposed behind surface 70 of metal substrate 4 (described below) to provide the desired pullout strength for thicker metal substrates 4, such as 0.074 inch thick steel.

There also needs to be adequate threads 30 directed toward head 18 so that there are enough threads 30 in case fastener 10 is overdriven.

In one embodiment, length 52 of threaded portion 26 is between about 1.5 and about 2.5 times as long as length 54 of drilling tip 20, and preferably about twice as long as length 54 of drilling tip 20. The relationship between the diameter of root 46 and the length of major axis L of drilling tip 20 depends on the application. For the case of a thicker metal substrate 4, such as 14 gauge steel, it is desirable for the length of major axis L to be longer than the diameter of root 46 to ensure that drilling tip 20 can drill through the thicker metal substrate 4 because flutes 28 radially extend farther from the axis of shank 12 than root 46. For a thinner metal substrate 4, such as 22 to 24 gauge steel, it may be preferable for the length of major axis L to be shorter than the diameter of root 46 so that flutes 28 do not radially extend as far from the axis as root 46.

Unthreaded portion 24 axially extends along shank 12 from threaded portion 26 to head 18 and includes a flared portion 66 at head 18. The length 56 of unthreaded portion 24 is substantially longer than length 52 of threaded portion 26. Flared portion 66 gradually increases the diameter of fastener 10 from unthreaded portion 24 to head 18, as shown in FIG. 1, and has a radius of curvature that is slightly larger than the diameter of unthreaded portion 24.

In one embodiment, length 56 of unthreaded portion 24 is between about 2.5 to about 3 times longer than length 52 of threaded portion, preferably length 56 of unthreaded portion 24 is between about 2.8 and about 2.9 times length 52 of threaded portion 26, and still more preferably length 56 of unthreaded portion 24 is about 2.85 times longer than length 52 of threaded portion. The diameter of unthreaded portion 24 is larger than the diameter of root 46, but less than the outer diameter of threads 30. In one embodiment, unthreaded portion 24 has a diameter of about 0.17 inches while root 46 has a diameter of about 0.15 inches and threads 30 have an outside diameter of about 0.215 inches.

It is believed that the extended length 56 of unthreaded portion 24 proximate to head 18 and the smaller length 52 of threaded portion 26 aid in the attachment of wood substrate 2 to metal substrate 4. If standard screws having a threaded length that is substantially the entire length of the shank are used for this application, the extended threads tend to engage with the wood substrate and continue to pull the screw through the wood. However, it is believed that the substantially longer length 56 of unthreaded portion 24 compared to the smaller length 52 of threaded portion 26 of the present invention prevent fastener 10 from continuing to pull through wood substrate 2 after drill point 22 hits metal substrate 4 as described below. Instead, in the present invention there are fewer threads 30 so that threaded portion 26 tends to strip away wood substrate 2 (See FIG. 6) instead of continuing to pull through, allowing fastener 10 to freely rotate in wood substrate 2 so that threads 30 and head 18 can clamp wood substrate 2 and metal substrate 4 together. Once drilling tip 20 has drilled through metal substrate 4, as described below, threads 30 can tap metal substrate 4 and draw it towards wood substrate 2 so that metal substrate 4 and wood substrate 2 can be tightly clamped together.

The head provides a clamping surface 58 which helps clamp wood substrate 2 to metal substrate 4, described below. The head also includes driving surface 60 having a recess 62 which accepts a bit (not shown) from a fastener driving tool. The head should be of a broad head design, such as a wafer head 19, shown in FIG. 10, or a bugle head 18, shown in FIG. 1, because a broad head can prevent fastener 10 from pulling through wood substrate 2. A bugle head 18, as shown in FIG. 1, is preferred because it is believed the bugle head can better stop the forward advancement of fastener 10 and prevent head 18 from pulling through wood substrate 2. Main portion 64 has a relatively short length and has a diameter that is between about 2 and about 3 times greater than the diameter of unthreaded portion 24.

Recess 62 also can have several configurations, such as a standard Phillips recess, a Phillips Square Drive (PSD) recess to accommodate a bit such as Illinois Tool Works Inc. part number 1588910, or a T-30 6 lobe recess to accommodate a bit such as Illinois Tool Works Inc. part number 18000910. Preferably, recess 62 is a PSD recess, as shown in FIG. 3, or a T-30 6 lobe recess (not shown) because they allow for better stability as fastener 10 is being driven and prevent cam-out of the bit.

As stated above, a preferred application for fastener 10 is the attachment of wooden support members having a thickness of about 1.5 inches, such as two-by-fours, to steel support members between 24 and 14 gauge, and preferably to steel support members between 18 and 22 gauge. For this application, fastener 10 has a total length of between about 1.75 inches and about 2.25 inches, and preferably fastener 10 has a total length of about 2 inches. Drilling tip 20 has a length of between about 0.215 inches and about 0.225 inches, with a preferred length of drilling tip 20 of about 0.22 inches. Threaded portion 26 has a length of between about 0.35 inches and about 0.5 inches, and preferably threaded portion has a length of about 0.41 inches. It also is preferred that end 68 of threaded portion 26 proximate to drilling tip 20 be at least about 1.725 inches away from driving surface 60 of head 18 to ensure that one or more pitches of threads 30, and preferably at least two pitches of thread 30 are on each side of metal substrate 4 when fastener 10 is installed, as described above. Unthreaded portion 24, including flared portion 66, has a length between about 1.25 inches and about 1.5 inches, with a preferred length of unthreaded portion being about 1.3 inches to about 1.37 inches, and a still more preferred length of unthreaded portion being about 1.31 inches. Main portion 64 of head 18 has a length of between about 0.02 inches to about 0.05 inches, with a preferred length of main portion 64 being about 0.03 inches. In the preferred embodiment, the diameter of drilling tip 20 and root 46 is about 0.15 inches, the outer diameter of threads 30 is about 0.215 inches, the diameter of unthreaded portion 24 is about 0.17 inches and the diameter of main portion 64 of head 18 is about 0.47 inches. Of course, it is contemplated that the above listed dimensions may vary depending on the particular application and substrate conditions.

An advantage of the preferred embodiment over the prior screws described above are that fastener 10 of the present invention can be made from less material than the prior screws because it is shorter than many screws used for the application of attaching wood with a 1.5 inch thickness to a medium to light gauge steel, where screws have been as long as 2.25 inches to 3.5 inches or more. The shorter fastener 10 is less expensive than the longer, prior screws. Further, because fastener 10 is shorter it provides for a shorter drill time, allowing a plurality of fasteners 10 of the present invention to be quickly installed. Another advantage of fastener 10 of the present invention is that because it is shorter, it is easier to handle and easier to keep stable as it is being driven, as shorter fasteners tend to be less wobbly and easier to handle than longer fasteners.

The method by which fastener 10 attaches wood substrate 2 to metal substrate 4 includes the steps of placing wood substrate 2 against metal substrate 4 in a desired position, selecting a fastener 10 for fastening the substrates, positioning drilling tip 20 of fastener 10 at a selected position on wood substrate 2, fitting a bit of a fastener driving tool (not shown) into recess 62, rotating fastener 10 with the fastener driving tool so that cutting surfaces 38 and 40 engage and drill into wood substrate 2 until threaded portion 26 engages in wood substrate 2 and pulls fastener 10 through wood substrate 2. Threads 30 of threaded portion 26 pull fastener 10 through wood substrate 2 until drill point 22 comes into contact with metal substrate 4, when cutting surfaces 38 and 40 engage and drill into metal substrate 4 until threads 30 tap metal substrate 4 and pull wood substrate 2 and metal substrate 4 together so that metal substrate 4 is clamped tight against wood substrate 2. The method can then be repeated with another fastener 10, either by drilling into the same wood substrate 2 to provide stability by attachment at a different location, where the new fastener 10 could attach wood substrate 2 to the same metal substrate 4 or to a second metal substrate (not shown), or the new fastener 10 can be driven into a second wood substrate (not shown) to attach the second wood substrate to the same metal substrate 4 or to a second metal substrate.

Fastener 10 has the advantage of not requiring a separate wood drilling step because drilling tip 20 easily drills through wood substrate 2. Some fasteners have required that wood substrate 2 be pre-drilled, and that the fastener is used to only drill through metal substrate 4. The pre-drilling step for these fasteners helps to avoid problems such as "wood jacking" where the threads engage the wood and force it, or "jack" it, away from the metal. A separate pre-drilling step such as one described requires more time per fastener, so that an installer cannot install the fasteners as fast as he or she could with a plurality of fasteners 10. The wood drilling step of the present invention, described above, allows drilling tip 20 of fastener 10 to drill through wood substrate 2 until drill point 22 hits metal substrate 4 without threads 30 causing "wood jacking" of wood substrate 2. After drill point hits metal substrate 4, drilling tip 20 drills through metal substrate 4 without having to change between a drill bit and a fastener intended solely for metal drilling.

Preferably, fastener 10 is rotated by a fastener driving tool (not shown) which provides the driving energy necessary to rotate fastener 10. As fastener 10 rotates, drilling tip 20 drills into wood substrate 2 and threads 30 pull fastener 10 forward through wood substrate 2 until drill point 22 hits metal substrate 4.

After drill point 22 hits metal substrate 4, fastener 10 goes through one of at least three alternative metal drilling steps. The first alternative metal drilling step occurs when pressure is applied to wood substrate 2 to force it down onto metal substrate 4 and prevent the substrates from pushing apart. One method of applying this pressure is by stepping down on wood substrate 2 while driving fastener 10. The first alternative metal drilling step also occurs when either wood substrate 2 is a softer wood, or when metal substrate 4 has a heavy gauge, or both. In this alternative, drill point 22 hits metal substrate 4 but does not easily pierce it, causing threads 30 of fastener 10 to spin in wood substrate 2 and strip away wood around threads 30, as shown in FIG. 6. As fastener 10 spins, drilling tip 20 drills into and through metal substrate 4.

A second alternative metal drilling step occurs when pressure is applied to wood substrate 2 and when wood substrate 2 is a harder wood, or when metal substrate 4 has a lighter gauge, or both. In this alternative, when drill point 22 hits metal substrate 4 it causes threads 30 to engage in wood substrate 2. The engaged threads 30 provide a force between drill point 22 and metal substrate 4, causing drill point 22 to pierce through metal substrate 4, as shown in FIG. 7, allowing drilling tip 20 to drill through metal substrate 4.

A third alternative metal drilling step is shown in FIG. 8. In this alternative, no pressure is applied to wood substrate 2 to force it against metal substrate 4. In this case, as fastener 10 is driven threads 30 continue to drive fastener 10 forward and drill point 22 pushes wood substrate 2 and metal substrate 4 apart. Eventually, metal substrate 4 and wood substrate 2 cannot be pushed apart any farther, and threads 30 begin to strip away some of the wood in wood substrate 2, as shown in FIG. 8, allowing fastener 10 to freely rotate so that drill point 22 drills through metal substrate 4 until threads 30 tap metal substrate 4.

After fastener 10 has drilled through metal substrate 4, fastener 10 is driven forward until threads 30 tap metal substrate 4 to allow wood substrate 2 and metal substrate 4 to be drawn towards each other so that the substrates can be clamped together. The final step in attaching wood substrate 2 to metal substrate 4 with fastener 10 is a clamping step. In the clamping step, fastener 10 is rotated and trailing support surface 50 of threads 30 acts against a bottom surface 70 of metal substrate 4 to draw wood substrate 2 towards metal substrate 4. Eventually, clamping surface 58 of broad head 18 comes into contact with top surface 72 of wood substrate 2 and prevents fastener 10 from pulling through wood substrate 2 so that as trailing support surface 30 engages metal substrate 4, wood substrate 2 and metal substrate 4 are clamped together.

Surprisingly it has been found that the shorter length 52 of threaded portion 26 and the substantially longer length 56 of unthreaded portion 24 allows fastener 10 to draw metal substrate 4 and wood substrate 2 together no matter which of the three alternative metal drilling steps occurs. This is believed to occur because there are fewer threads 30 to engage wood substrate 2, which prevents fastener 10 from continuing to pull through wood substrate 2, but instead allows thread 30 to draw wood substrate 2 towards metal substrate 4 and clamp them together.

In the present invention, after threaded portion 26 has pulled fastener 10 through wood substrate, a substantial portion of shank 12 that is still in wood substrate 2 is unthreaded portion 24, which tends to spin in wood substrate 2 without continuing to drive fastener 10 forward. It is also believed that the remaining threads 30 in wood substrate 2 do not provide enough force to drive fastener 10 forward so that fastener 10 spins without continuing to be driven. Therefore, threads 30 are allowed to tap metal substrate 4 and clamp it against wood substrate 2, as shown in FIG. 9. As fastener 10 rotates within wood substrate 2, trailing support surface 50 of threads 30 engage metal substrate 4 and draw it towards wood substrate 2.

The present invention provides a novel fastener for clamping attachment of a two-by-four to a light gauge metal substrate where the unthreaded portion proximate the head is substantially longer than a threaded portion. The threaded portion needs to have few enough threads so that the fastener is self-tapping and so that the threads strip out the wood, if necessary, after traveling through the wood so that the fastener will clamp the wood and metal together instead of continuing to drive through the wood.

The present invention is not limited to the above-described embodiments, but should be limited solely by the following claims.

What is claimed is:

1. A self-drilling fastener for attaching wood substrates to metal substrates comprising:
   an elongate shank defining an axis and having a first end and a second end;
   a drilling tip at the first end of the shank, the drilling tip having a drill point and an axial length;
   a broad head formed at the second end of the shank;
   wherein the shank has a threaded portion axially extending from the drilling tip towards the head, the threaded portion having helical threads, an axial length of between about 0.35 inches and about 0.5 inches, a root diameter and a thread diameter, the thread diameter being greater than the root diameter, the length of the threaded portion being greater than the length of the drilling tip; and
   wherein the shank has an unthreaded portion axially extending from the threaded portion to the head, the unthreaded portion having an axial length of between about 1.25 inches and about 1.5 inches and a diameter, the diameter of the unthreaded portion being smaller than the thread diameter.

2. A self-drilling fastener according to claim 1, wherein the fastener has a total length of between about 1.75 inches and about 2.25 inches.

3. A self-drilling fastener according to claim 1, wherein the length of the threaded portion is between about 1.5 and about 2.5 times the length of the drilling tip.

4. A self-drilling fastener according to claim 1, wherein the length of the drilling tip is about 0.2 inches, the length of the threaded portion is about 0.4 inches and the length of the unthreaded portion is about 1.2 inches for use with a wood substrate having a thickness of about 1.5 inches.

5. A self-drilling fastener according to claim 1, wherein the drilling tip further comprises at least one flute.

6. A self-drilling fastener according to claim 1, wherein the broad head is a bugle head.

7. A self-drilling fastener according to claim 1, wherein the broad head is a wafer head.

8. A self-drilling fastener according to claim 1, wherein the threads are buttress threads.

9. A self-drilling fastener according to claim 8, wherein the buttress threads include a leading support surface and a trailing support surface, wherein the trailing support surface is oriented at a first predetermined angle with respect to a line normal to the axis of the shank, and the leading support surface is inclined with respect to the normal line at a second predetermined angle which is greater than the first predetermined angle.

10. A self-drilling fastener according to claim 9, wherein the first predetermined angle is about 7 degrees with respect to the normal line and the second predetermined angle is about 30 degrees with respect to the normal line.

11. A self-drilling fastener according to claim 1, wherein the drilling tip is generally elliptical and has a major axis, the major axis having a length, wherein the length of the major axis is greater than the root diameter of the threaded portion.

12. A self-drilling fastener according to claim 1, wherein the wood substrates have a thickness of about 1.5 inches and the metal substrates are steel having a gauge of between 24 gauge and 14 gauge.

13. A self-drilling fastener for attaching a wood substrate to a metal substrate, comprising:
   an elongate shank having an axis, a first end, and a second end;
   a drilling tip at the first end of the shank;
   a broad head formed at the second end of the shank;
   wherein the shank has a threaded portion axially extending from the drilling tip towards the head and an unthreaded portion axially extending from the threaded portion to the head, the threaded portion having an axial length of between about 0.35 inches and about 0.5 inches, the unthreaded portion being substantially longer than the threaded portion; and
   wherein the fastener is designed so that at least one pitch of the threads is on each side of the metal substrate when the fastener is installed.

14. A self-drilling fastener according to claim 13, wherein the threaded portion has a root diameter and the drilling tip has a diameter larger than the root diameter.

15. A self-drilling fastener according to claim 13, wherein the threaded portion has a root diameter and the drilling tip is generally elliptical having a major axis that is longer than the root diameter.

* * * * *